(12) United States Patent
Peachee (10) Patent No.: US 8,749,899 B1
(45) Date of Patent: Jun. 10, 2014

(54) ENVIRONMENT VIEWING ENABLING SYSTEM AND METHOD

(76) Inventor: Thomas Albert Peachee, Whitmore, CA (US)

(*) Notice: Subject to any disclaimer, the term of this patent is extended or adjusted under 35 U.S.C. 154(b) by 0 days.

(21) Appl. No.: 13/310,767

(22) Filed: Dec. 4, 2011

Related U.S. Application Data

(60) Provisional application No. 61/420,250, filed on Dec. 6, 2010.

(51) Int. Cl.
*G02B 7/02* (2006.01)
(52) U.S. Cl.
USPC .......................................... 359/813; 359/824
(58) Field of Classification Search
USPC .......... 359/803, 813, 814, 819, 822, 823, 824
See application file for complete search history.

(56) References Cited

U.S. PATENT DOCUMENTS 6,731,439 B1 * 5/2004 Peachee ...................... 359/813

* cited by examiner

*Primary Examiner* — Tuyen Tra
(74) *Attorney, Agent, or Firm* — Howard N. Sommers (57) ABSTRACT

An environment viewing enabling system for enabling viewing of an environment through a partition. The system enables clear and magnified viewing of the environment therethrough at controllably moveable locations thereof about the partition. The system may constitute a single hand-held exterior housing, for convenience of maneuverability and viewing. The system may include the exterior housing and an interior housing, one of which may be comprised of magnetic material, while the other is comprised of a metallic material, enabling magnetic attraction between the housings. The interior housing may be buoyant, enabling it to float to the top of a liquid environment if it becomes separated during use. The interior housing may include a lens, for enabling a longer field of view of the specimens within the environment. The system may include lighting, for illuminating the specimens within the environment.

1 Claim, 9 Drawing Sheets

ENVIRONMENT VIEWING ENABLING SYSTEM AND METHOD

CROSS-REFERENCE TO RELATED APPLICATION

This application is claiming the benefit of a provisional application Ser. No. 61/420,250 filed on Dec. 6, 2010.

COPYRIGHTABLE SUBJECT MATTER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention is generally related to viewing systems and methods, and more particularly, to an environment viewing enabling system for enabling controlled and effective viewing of an environment.

2. General Background and State of the Art

An environment viewing system enables the user to view an environment such as one which includes a partition, so as to provide a view of the environment through the partition, as for viewing a specimen or specimens in a tank environment. The tank environment is bounded by the partition such as panes of glass or acrylic. The tank environment may consist of a marine tank environment, with marine specimens therein, or a dry tank environment, with land specimens therein.

Environment viewing systems may be used by hobbyists, researchers, students, or others, for effective viewing of a specimen or specimens in a tank environment through a partition. Such a system may include a magnifying lens to enhance observation of the specimen or specimens.

However, for effective viewing, the partition surfaces should be clean to enable clear viewing therethrough. Further, the system should be controllable and movable to enable viewing at a variety of locations. Also, magnification may be variable for enabling enhanced viewing. Still further, the system may include exterior and interior housings for effective viewing and maneuverability.

Also, if the exterior and interior housings are misaligned and become separated during use, the interior housing may sink in a liquid environment, requiring an individual to retrieve the interior housing from the bottom of the liquid environment.

Further, the system may include a housing and an interactive plate, for effective viewing and maneuverability. The system may also comprise a hand-held viewing device, for convenience of maneuverability and viewing. The system may still further include lighting such as light emitting diodes for illuminating the specimens within the tank environment. The system may also comprise a lens in the interior housing, for enabling a longer field of view of the specimens within the tank environment.

Therefore, it would be desirable to provide a system which is capable of enabling the viewing of an environment through a partition in an efficient and effective manner.

SUMMARY OF THE INVENTION

Briefly, and in general terms, in accordance with aspects of the invention, and in preferred embodiments, by way of example, it is, therefore, one of the primary objects of the present invention to provide a system for improved viewing of an environment through a partition.

It is another object of the present invention to provide a system which enables viewing in an environment wherein the environment includes a partition for partitioning the environment from an external environment, and the partition includes an exterior surface and an interior surface. The system includes an exterior housing, position able on the exterior surface of the partition and slidably moveable thereabout. The exterior housing includes a frame, which includes a magnet therein having a facing surface for facing the exterior surface of the partition, which facing surface has a polarity. The frame further has a central opening for enabling viewing the environment therethrough.

It is a further object of the present invention to provide a system which also includes an interior housing, positionable on the interior surface of the partition and slidably moveable thereabout in alignment and coordination with and under the control of slidable movement of the exterior housing. The interior housing includes a frame which includes a magnet therein having a facing surface able to face the interior surface of the partition, which facing surface has a polarity. The polarity of the exterior housing frame magnet facing surface and the interior housing frame magnet facing surface are the opposite of each other, and interact so as to enable the movement of the exterior housing to control the movement of the interior housing. The interior housing frame further has a central opening for enabling viewing the environment therethrough.

It is also an object of the present invention to provide a system which provides efficient and effective viewing through a partition in relation to an environment.

It is another object of the present invention to provide a system which enables securely aligned and controllably moveable positioning thereof to various locations on the partition, for a variety of viewing opportunities.

It is still a further object of the present invention to provide a system which provides magnified viewing in the environment, and at variable magnifications and adjustable fields of depth.

It is yet another object of the present invention to provide a system which enables cleaning of partition surfaces upon movement thereof, to enable improved clear viewing therethrough.

It is still a further object of the present invention to provide a system which enables the interior housing to be buoyant, enabling it to float to the top of a liquid environment if it becomes separated during use, for efficient retrieval thereof.

It is still a further object of the present invention to provide a system which includes an exterior housing and an interior housing, one of which may be comprised of magnetic material, while the other is comprised of a metallic material, enabling magnetic attraction between the housings.

It is still another object of the present invention to provide a system which comprises a housing which includes a magnifying lens which is slidably movable along the exterior surface of the environment, for handheld viewing of the environment, It is a still further object of the present invention to provide a system which includes lighting, such as light emitting diodes, incorporated in an exterior housing, for the specimens within the tank environment.

It is still another object of the present invention to provide a system which includes a lens in the interior housing, for an extended and longer field of view within the tank environment.

These and other aspects and advantages of the invention will become apparent from the following detailed description, taken in conjunction with the accompanying drawings, which describe and illustrate, by way of example, the features of the invention.

DETAILED DESCRIPTION OF THE PREFERRED EMBODIMENTS

Referring now in more detail and by reference characters to the drawings which illustrate preferred embodiments of the present invention, and in particular referring to the drawings, FIGS. 1-12, in which like reference numerals refer to corresponding components, the system 10 for example enables magnified viewing of a specimen or specimens in a tank environment 12. The tank environment 12 includes a partition 14, for partitioning the tank environment 12 from an external environment, and the partition 14 includes an exterior surface 16 and an interior surface 18. The tank environment 12 may for example constitute a marine tank environment, with marine specimens therein, such as fish, invertebrates, corals, crustaceans, clams, or shrimp. It may alternatively constitute a dry tank environment, for example with reptiles, amphibians, or insects therein. It may still further for example constitute a display case for jewelry, crystals, or gemstones or for museum artifacts. The partition 14 may for example be comprised of glass or acrylic.

Figure 5:
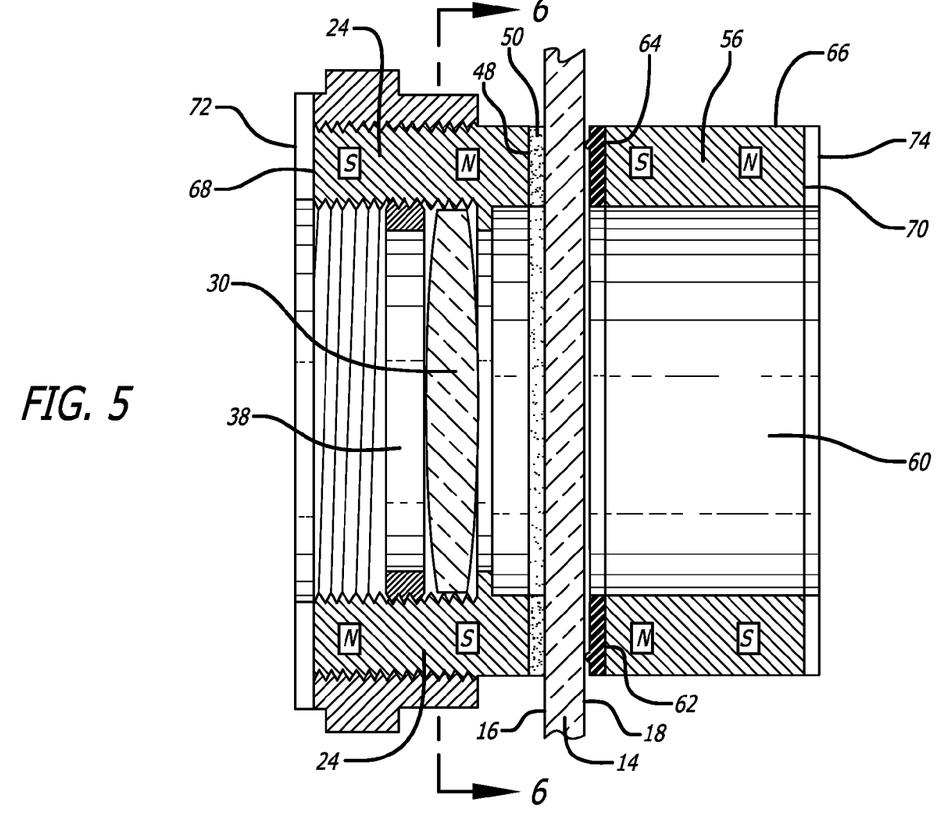
FIG. 5 is an elevational cross-sectional view of the system and partition in a multiple magnet exterior housing and interior housing version of the system in accordance with the present invention.
Figure 6:
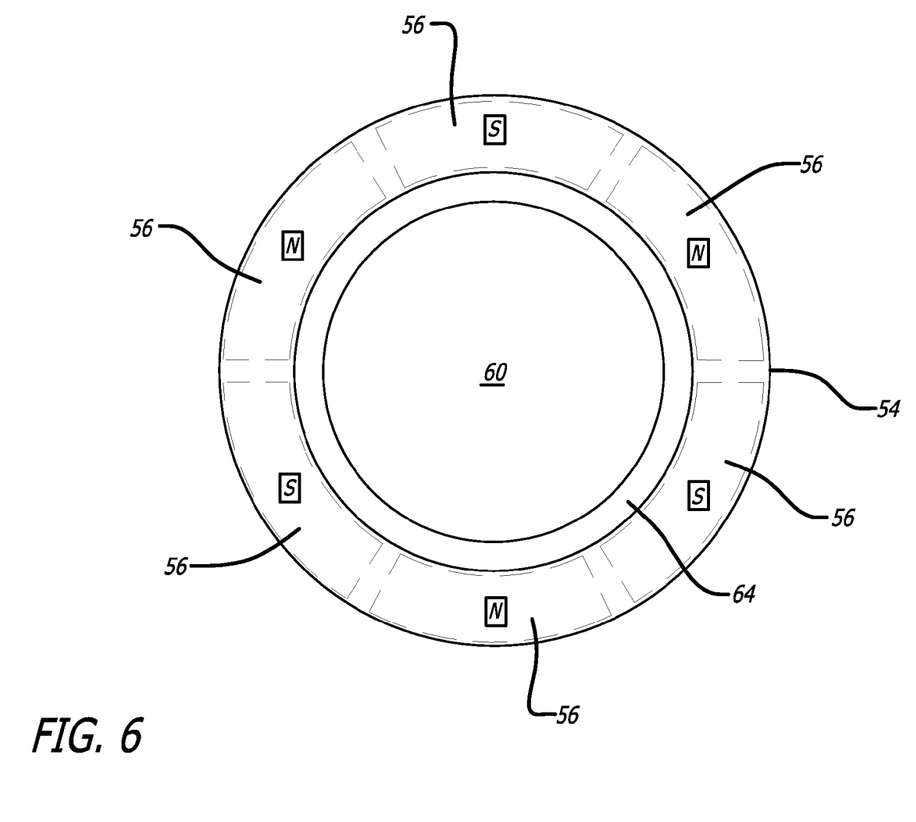
FIG. 6 is a front elevational view of the multiple magnet exterior housing and interior housing version of the system in FIG. 5 in accordance with the present invention, taken along line 6-6.
Figure 7:
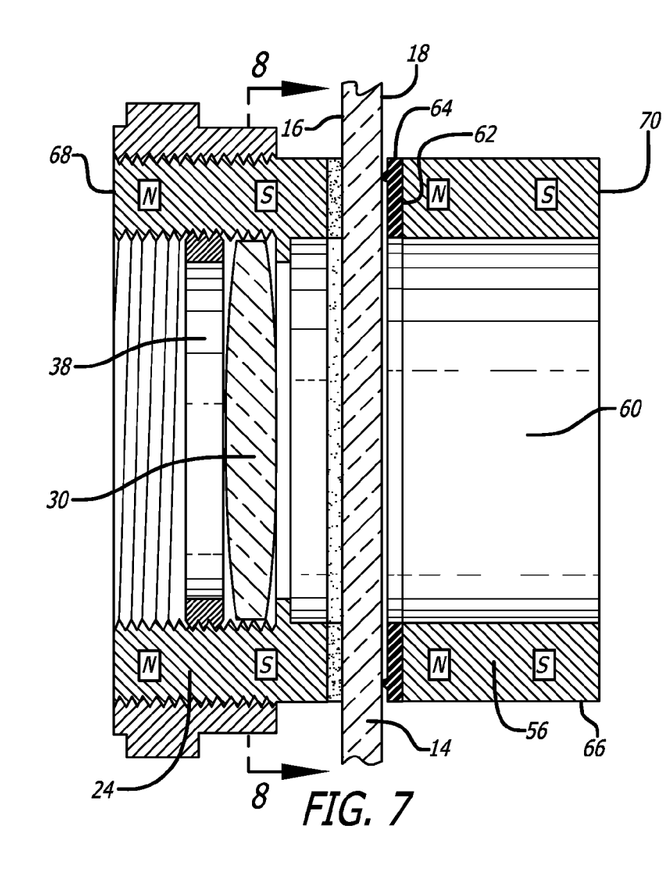
FIG. 7 is an elevational cross-sectional view of the system and partition in a single magnet exterior housing and interior housing version of the system in accordance with the present invention.
Figure 8:
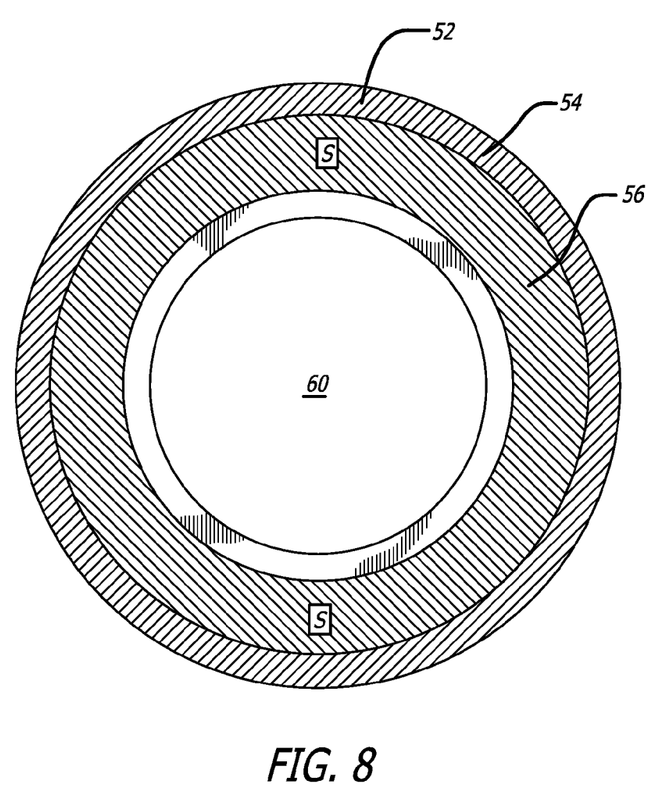
FIG. 8 is a front elevational view of the single magnet exterior housing and interior housing version of the system in FIG. 7 in accordance with the present invention, taken along line 7-7.
Figure 9:
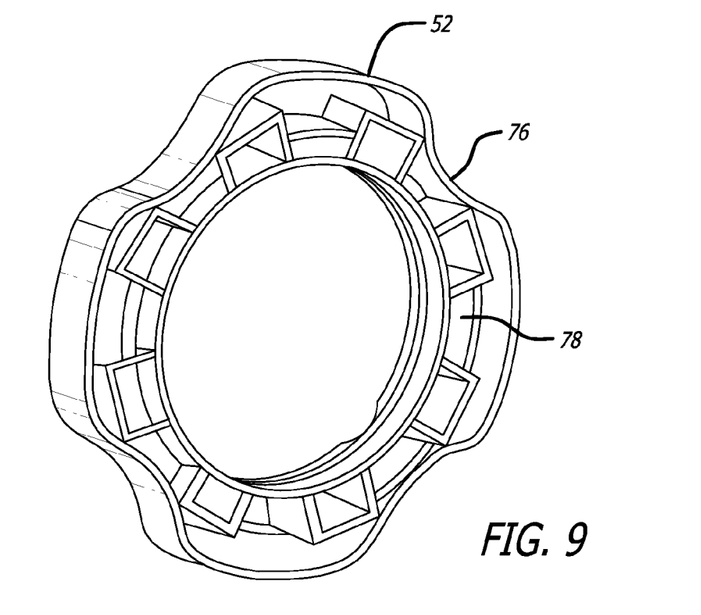
FIG. 9 is a perspective view of an interior portion of an interior housing in accordance with the present invention.
Figure 10:
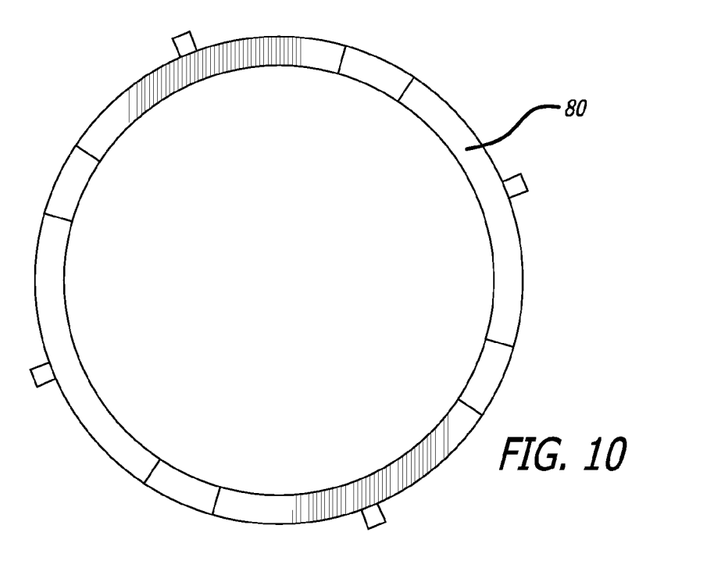
FIG. 10 is a front elevational view of a locking ring for an interior housing and an exterior housing in accordance with the present invention.

The system 10 may be provided in a variety of shapes and sizes, including for example round, square, or rectangular shapes, and large or small sizes. It includes an exterior housing 20, positionable on the exterior surface 16 of the partition 14 and slidably moveable thereabout. The exterior housing 20 includes a frame 22, which, as shown in FIGS. 5-6, may include a series of magnets 24 therein, each having a facing surface 26 which is able to face the exterior surface 16 of the partition 14, which facing surface 26 has a polarity. Alternatively, for example, the exterior housing frame 22, as seen in FIGS. 7-8, may include a single magnet 24 which includes a facing surface 26 having a polarity. The exterior housing frame 22 further has a central opening 28, for enabling viewing therethrough. It may alternatively include 10 a magnifying lens 30 mounted in the central opening 28 for enabling the magnified viewing of the specimen in the tank environment 12 therethrough.

Figure 1:
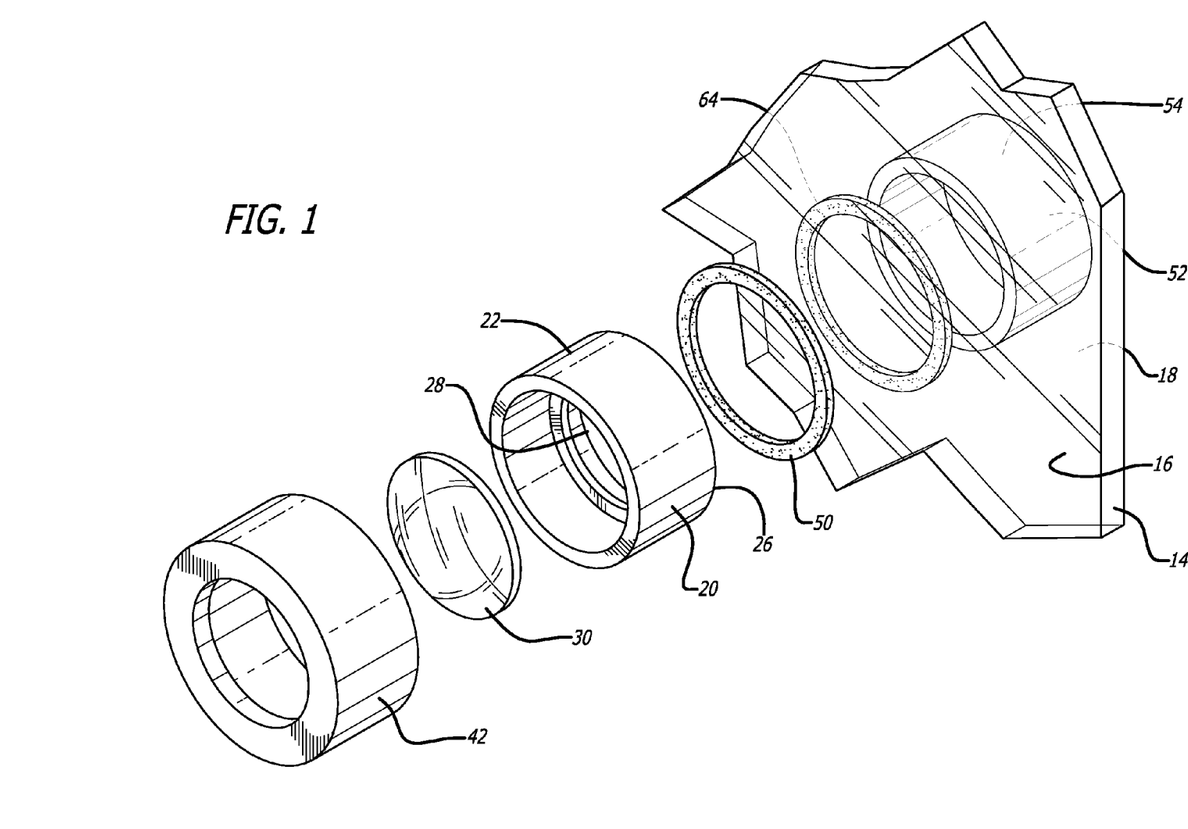
FIG. 1 is an exploded perspective view of an environment viewing enabling system and partition in an embodiment in accordance with the present invention.
Figure 2:
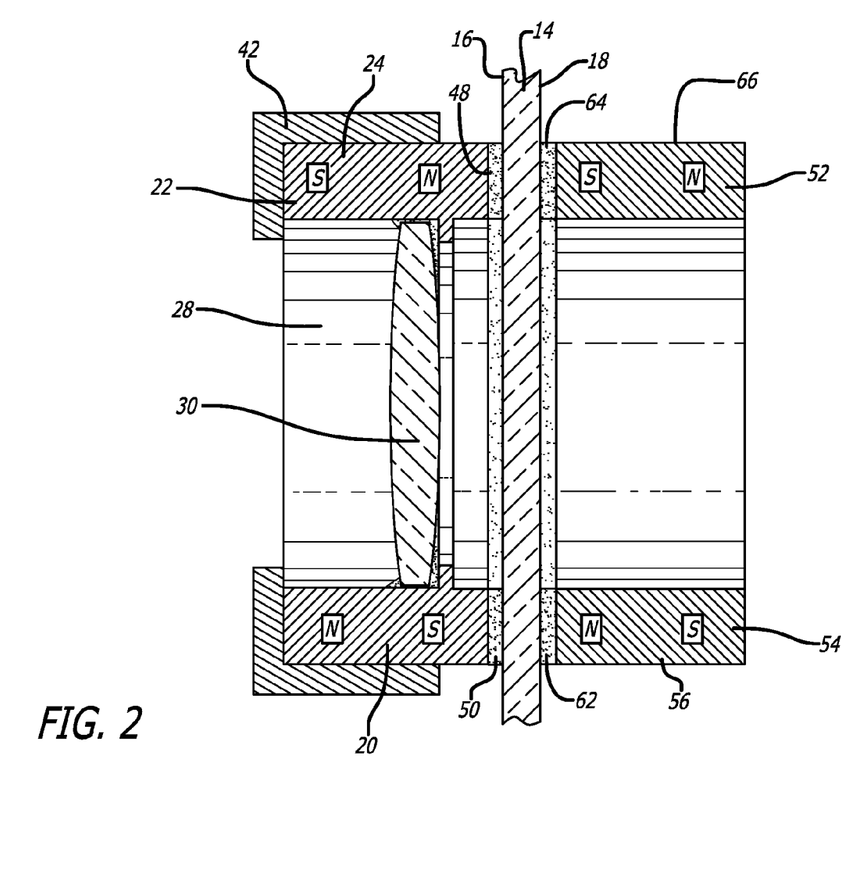
FIG. 2 is an elevational cross-sectional view of the system in FIG. 1 in accordance with the present invention.
Figure 3:
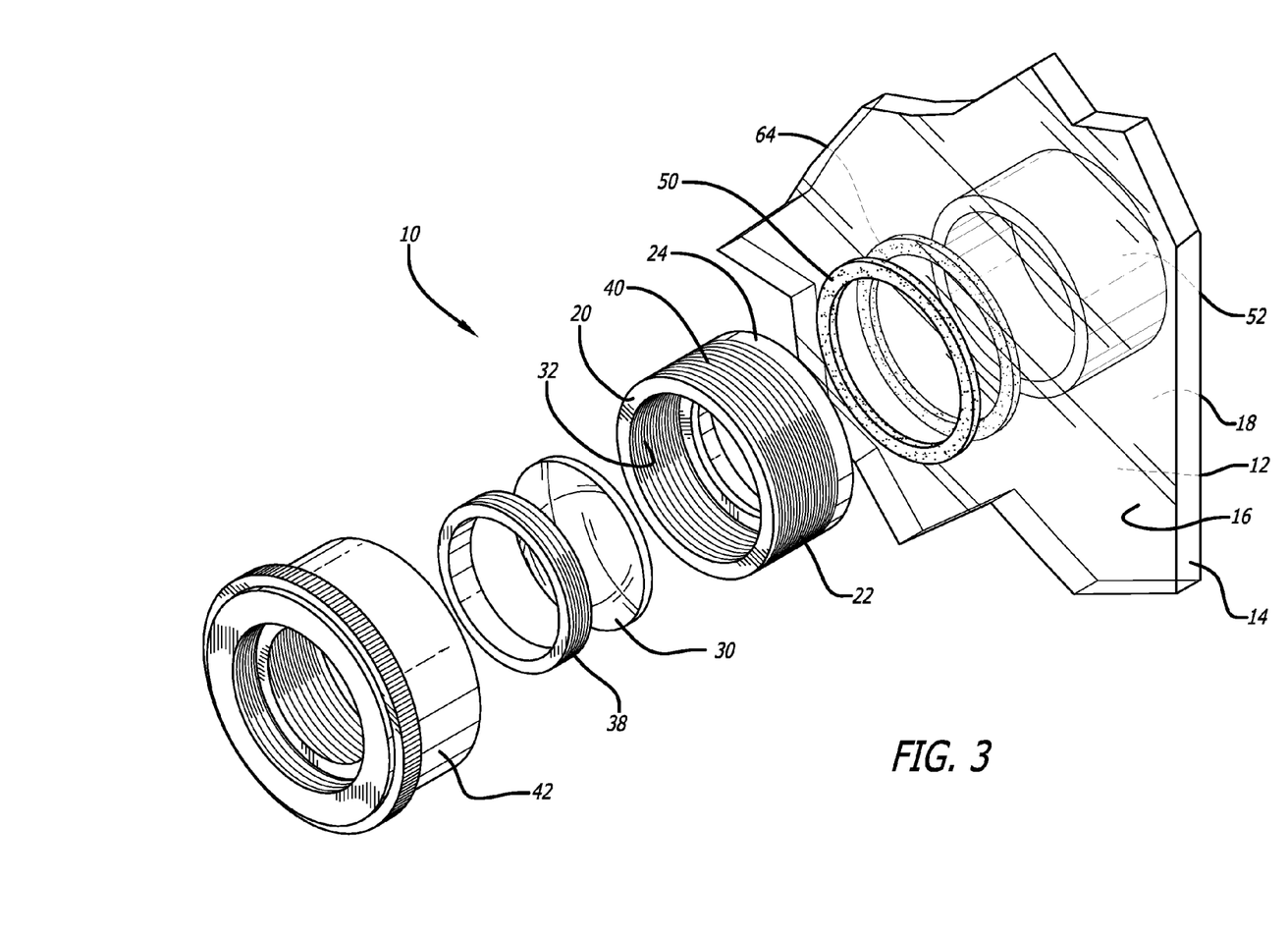
FIG. 3 is an exploded perspective view of an environment viewing enabling system and partition in another embodiment in accordance with the present invention.
Figure 4:
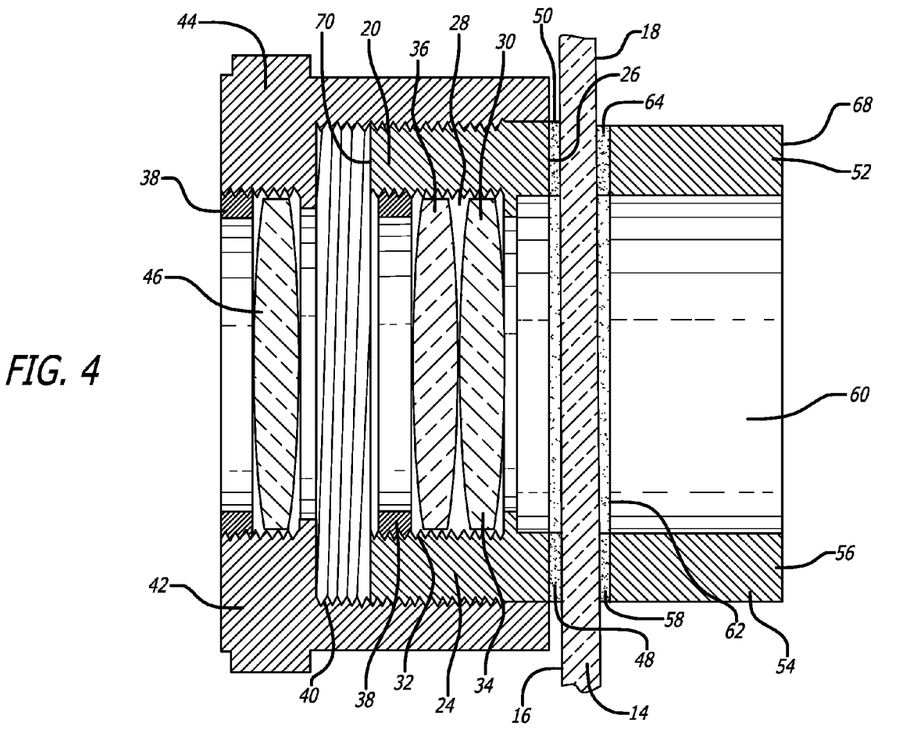
FIG. 4 is an elevational cross-sectional view of the system in FIG. 3 in accordance with the present invention.

The exterior housing frame 22 may include interior threads 32, as shown in FIGS. 3-4, to enable the magnifying lens 30, an interchangeable magnifying lens 34, and/or an additional magnifying lens or lenses 36, to be secured therein for example by a retaining ring 38 threadably retained therein. In the embodiment wherein the exterior housing frame 22 does not include interior threads as depicted in FIGS. 1-2, the magnifying lens 30 may be 20 glued or otherwise secured therein. The exterior housing frame 22 may in addition include a light filter or light filters therein.

The exterior housing frame 22 also may also include exterior threads 40, for enabling accessories to be secured thereto, such as a finishing ring 42, an additional housing 44, or a further lens or lenses 46. Other accessories which may be secured thereto include for example a telescope lens housing, a microscope lens housing, a light source, a light filter, a camera, or a videocamera. Such accessories may be connected to the exterior housing frame for example by screw threading or adapter coupling thereto. The magnifying lens 30, interchangeable magnifying lens 34, additional magnifying lens or lenses 36, and further lens or lenses 46 provide focusability, varying magnifications, and varying depths of field.

The exterior housing frame 22 further includes a facing surface 48 which can face the partition exterior surface 16, and a pad 50 secured to the facing surface 48. The exterior housing frame 22 may further include an element for enabling adjustable movement of a magnifying lens relative to the frame central opening 28, such as a thumb set screw or rotatable adapter housing for enabling relative movement thereof. The exterior housing frame 22 and the interior housing frame 54 may each further include an element, such as ball bearings comprised for example of Teflon, mounted on the facing surfaces 26 and 58 thereof, for further enabling slidable movement about the partition exterior surface 16 and interior surface 18, for example in an oversized environment such as a very large tank environment 12 with very strong exterior and interior magnets 24 and 56.

The system 10 also includes an interior housing 52, positionable on the interior surface 18 of the partition 14 and slidably moveable there about, in alignment and coordination with and under the control of slidable movement of the exterior housing 20. The interior housing 52 includes a frame 54 which may include a series of magnets 56 therein, each having a facing surface 58 which is able to face the interior surface 18 of the partition 14, which facing surface 58 has a polarity. The interior housing frame 52 may alternatively, for example, include a single magnet 56 which includes a facing surface 58 having a polarity. The interior housing frame 54 further has a central opening 60 for enabling the viewing of the specimen in the tank environment 12 therethrough. The interior housing frame 54 may also include exterior threads, to which accessories may be attached such as for example a feeding tube extension or a pregnant fish netted birthing bag. It may include interior threads, for example in an environment such as a marine environment where external threads may create problems, for connecting an accessory such as a feeding station or a branch surface. The interior housing frame 54 further includes a facing surface 62 which can face the partition interior surface 18, and a pad 64 secured to the facing surface 62.

The tank environment 12 may constitute a marine tank environment, and the interior housing frame magnets or magnet 56 may include a material such as nickel plating covering the exterior surfaces or surface 66 thereof, for preventing leaching of the magnet material, iron, or chemicals, into the marine tank environment. In such marine tank environment, the pad 64 may be comprised of a material for enabling the cleaning of the partition interior surface 18, for example from algae or the like, upon movement of the interior housing 52, to enable a clear field of view of the specimen in the tank, and may be adhesive backed. The pad 64 material in such environment may consist of a vinyl or dense pile material, and may be replaceable.

The tank environment 12 may alternatively constitute a dry tank environment, wherein the pad 64 may consist of a material for enabling the dry viewing of the specimen in the tank, and may be adhesive-backed. The pad 64 material in such environment may comprise a vinyl or felt pad, and may be replaceable. For large specimen tanks, which may require strong magnets to enable controlled movement of the exterior housing frame 22 and the interior housing frame 54, a pair of handles may be incorporated into the exterior housing frame 22 for gripping in aid of movement thereof.

The polarity of the facing surfaces 26 of the series of exterior housing frame magnets 24 or the facing surface 26 of the single exterior housing frame magnet 24, and the facing surfaces 58 of the series of interior housing frame magnets 56 or the facing surface 42 of the single interior housing frame magnet 40, are the opposite of each other, constituting opposing north and south poles, and interact so as to enable the movement of the exterior housing 20 to control the movement of the interior housing 52. The magnetic attraction of the opposite polarity of the series of exterior housing frame magnets 24 or the single exterior housing frame magnet 24, and the series of interior housing frame magnets or the single interior housing frame magnet 56 is able to maintain the alignment of the exterior housing frame 22 and the interior housing frame 54, while preventing separation and detachment thereof. The dry tank environment pad 64 may minimize resistance to movement and inhibit scratching of the partition 14. A consideration regarding the strength of the series of exterior housing frame magnets 24 or the single exterior housing frame magnet 24, and the series of interior housing frame magnets 56 or the single interior housing frame magnet 56 is the thickness of the partition 14.

The opposite polarity of the exterior housing frame magnet 24 and the interior housing frame magnet 56 generates a path of magnetic flux therebetween. The exterior housing frame 22 further includes an opposite surface 68 thereof, which is able to face away from the partition exterior surface 16, and the interior housing frame 54 further includes an opposite surface 70 thereof, which is able to face away from the partition interior surface 18. The exterior housing frame 22 may further include a steel plate 72 located on the opposite surface 68, and the interior housing frame 54 may further include a steel plate 74 located on the opposite surface 70, as seen in FIG. 5.

The exterior housing frame steel plate 72 and the interior housing frame steel plate 74 complete the path of magnetic flux between the exterior housing frame magnets or magnet 24 and the interior housing frame magnets or magnet 56, reducing reluctance so as to provide additional magnetic force. The exterior housing frame magnets or magnet 24 and the interior housing frame magnets or magnet 56 may be comprised of permanent rare earth magnets. The permanent rare earth magnets or magnet 24 and 56 may be comprised of Neodymium.

As illustrated in FIGS. 1-8, in a method for example for 10 the use of the system 10, the user may position the exterior housing 20 on the exterior surface 16 of the partition 14 so as to position the exterior housing frame pad 50, which in the dry tank environment may constitute a dry viewing enabling material pad such as felt, on the partition exterior surface 16. Adjustable movement of the magnifying lens 30 in the frame central opening 28 may be effected by actuation of an adjustable movement enabling element such as for example a thumb set screw. Slidable movement of the exterior housing 20 may further be assisted by a facing-surface mounted element such as ball bearings for example consisting of Teflon.

Interchangeable magnifying lenses 34 may be interchanged in the exterior housing frame 22 for variation of specimen magnification, or alternatively the additional magnifying lenses 36 and/or the further magnifying lenses 46 may be connected thereto or inserted therein for such variation. The user may also position the interior housing 52 on the interior surface 18 of the partition 16, such that the interior housing frame pad 64, which in the marine tank environment may consist of a partition inner surface cleaning enabling material pad such as a dense pile pad, is positioned on the partition interior surface 18. Leaching of the magnet material from the interior housing frame magnets or magnet 56 in a marine tank environment is prevented by leaching-preventing material such as nickel plating covering the magnet.

The opposite polarity interaction of the exterior housing frame magnets or magnet 24, which may consist of a permanent rare earth magnet such as a Neodymium magnet, and the interior housing frame magnets or magnet 56, which also may consist of a permanent rare earth magnet such as a Neodymium magnet, enable the movement of the exterior housing 20 to control the movement of the interior housing 52. Alignment of the exterior housing frame 22 and the interior housing frame 54 is maintained responsive to the opposite polarity of the exterior housing frame magnet 24 and the interior housing frame magnet 56. An addition of the exterior frame steel plate 72 to the exterior housing frame 22 and the interior frame steel plate 74 to the interior housing frame 54 completes the path of magnetic flux between the exterior housing frame magnets or magnet 24 and the interior housing frame magnets or magnet 56.

Figure 11:
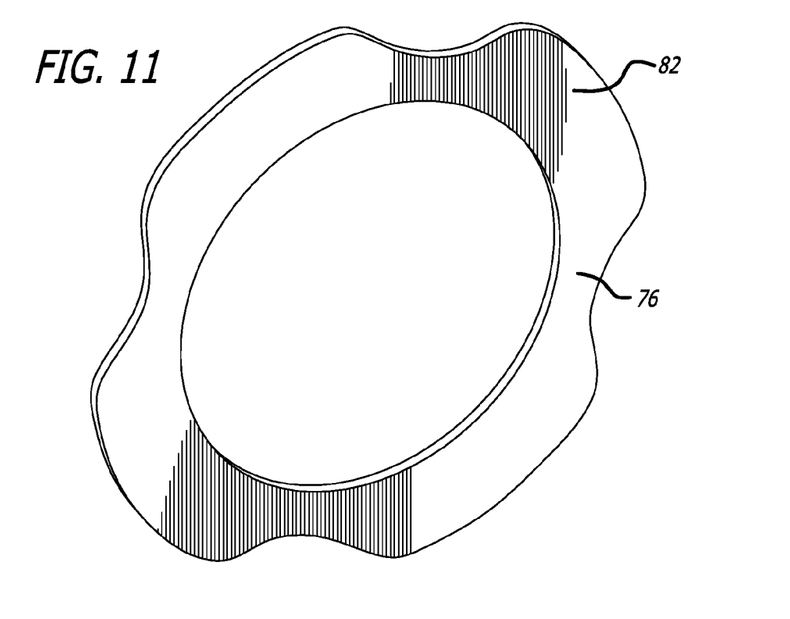
FIG. 11 is an perspective view of a backing plate for an interior housing and/or an exterior housing in accordance with the present invention.
Figure 12:
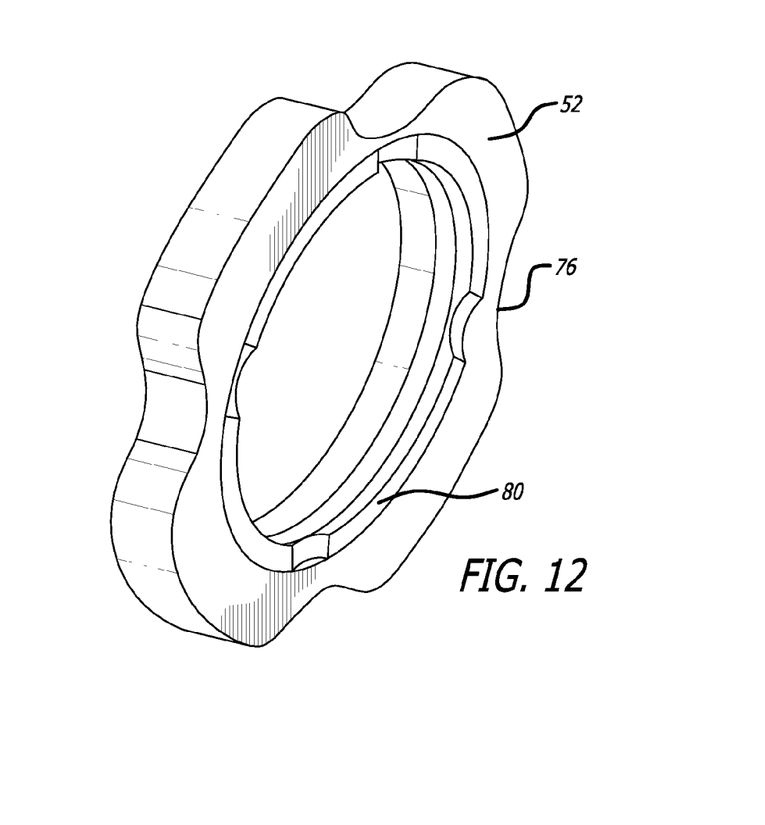
FIG. 12 is a perspective view of the exterior of an interior housing and/or an exterior housing in accordance with the present invention.

The interior housing 52, and the exterior housing 20, as seen in FIGS. 9-12, may be shaped with grooves 76 thereabout, for gripping and movement. The interior housing 52, and the exterior housing 20, may also include enlarged air spaces 78, and/or may be comprised of a floatable material, to enable floating of the interior housing 52 in the event that the interior housing 52 becomes separated from the exterior housing 20 during use thereof. In the event of separation, the floatable interior housing 52 prevents sinking to the bottom, and enables removal from the top, of a liquid tank environment, and further enables magnetic re-connection of the interior housing 52 to the exterior housing 20 through the partition 14. A fractional turn locking ring 80 in the interior housing 52 enables the attachment of various accessories, such as lights, a feeding station, a hatchery, ornaments, and the like. Backing plates 82, one of which is seen in FIG. 11, seal, enclose, and separate the magnet 24 in the exterior housing and the magnet 56 in the interior housing from the environment. The sealing by the backing plates 82 prevents liquid from coming into contact with the magnets 24 and 56, which prevents magnet corrosion or environment contamination such as leaching in a liquid environment.

The present invention enables the interior housing to be buoyant, enabling it to float to the top of a liquid environment if it becomes separated during use, for efficient retrieval thereof. If the exterior and interior housings were to be misaligned and become separated during use, the interior housing may otherwise sink in a liquid environment, requiring an individual to retrieve the interior housing from the bottom of the liquid environment. The interior housing herein includes buoyant materials, and provides sufficient sealed airspace, to enable the interior housing to float to the surface. The capability of floating prevents the interior housing from falling to the bottom of the tank or damaging any specimens in the event it became detached.

In an embodiment of the present invention, the system includes an exterior housing and an interior housing, one of which may be comprised of magnetic material, while the other is comprised of a metallic material, enabling magnetic attraction between the housings. The system may include a housing and an interactive plate, for effective viewing and maneuverability. The interior housing would use a metal plate to complete the magnetic attraction with the exterior housing. This magnetic attraction would allow for complete mobility while still staying attached to the exterior-interior separation. The metal plate may reduce the cost of manufacturing and may allow for a more slim line interior housing. This slim line feature may allow the interior housing to move past specimens that are closer to the glass partition.

In another embodiment of the invention, the system may comprise a single housing hand-held viewing device, for convenience of maneuverability and viewing. The system may comprise a single housing which includes a magnifying lens, which is slidably movable along the exterior surface of the environment, for handheld viewing of the environment, The exterior housing would not include magnets, since it would be used as a separate hand held device. This would allow users to take advantage of the included prescription lens, including the ability to replace one prescription lens with another to acquire different magnifications and different depth of fields. This would also allow users to view multiple tanks within an exhibit such as a public aquarium without the facility having to have the system attached to a specific tank environment. The variety of prescription lenses would enable various magnifications and different focal lengths. Unlike magnifying glasses that have a specific focal length, these prescription lenses would bring everything within a given range into focus. This handheld system would enable facilities such as schools, museums or public aquariums the opportunity to provide the system to visitors to use within their exhibits.

Further, in an embodiment of the invention, the system may include lighting such as light emitting diodes for illuminating the specimens within the tank environment. The system includes such lighting, such as light emitting diodes, incorporated in an exterior housing, for viewing the specimens within the tank environment. Lights may be incorporated into either the interior housing exterior surface, or around the exterior housings perimeter, to illuminate the specimens within the tank environment. On the interior housing these lights may be battery operated and may be turned on or off using a remote control device. On the exterior housing these light may be battery operated or may have an external power cord that may be plugged into the light source for extended use. Some specimens only come out at night or become more visible with a direct light source, and could therefore be viewed with such lighting. The lighting may provide a low blue light, to simulate the moon effect, or more intense colors or combinations of colors to stimulate growth or show off the phosphorescence of the specimens. The system with the lighting would allow for the lights to move with the system and stay in place as the user lets go of the system.

In still another embodiment of the invention, the system may also comprise a lens in the interior housing, for enabling a longer field of view of the specimens within the tank environment.

While the system has been shown and described in connection with the magnified viewing of a specimen or specimens in a tank environment, it may alternatively enable non-magnified viewing therein, or magnified or non-magnified viewing in any environment which includes a partition, such as for example a display case or an enclosure.

From the foregoing it will be appreciated that the system of the present invention provides advantages in enabling controlled manipulation of viewer housings for viewing in an environment. While several particular forms of the invention have been illustrated and described, it will be apparent that various modification can be made without departing from the spirit and scope of the invention. Accordingly, the invention is not to be limited thereby.

I claim:

1. A system for enabling viewing in an environment, wherein the environment includes a partition for partitioning the environment from an external environment, and the partition includes an exterior surface and an interior surface, comprising:

an exterior housing, adapted to be positioned on the surface of the partition and to be slidably moveable thereabout, including a frame, which frame further has a central opening for enabling viewing the environment therethrough, wherein the exterior housing includes a magnet therein having a facing surface adapted to face the exterior surface of the partition, which facing surface has a polarity, and wherein the system further comprises an interior housing, adapted to be positioned on the interior surface of the partition and to be slidably moveable thereabout in alignment and coordination with and under the control of slidable movement of the exterior housing, including a frame which includes a magnet therein having a facing surface adapted to face the interior surface of the partition, which facing surface has a polarity, wherein the polarity of the exterior housing frame magnet facing surface and the interior housing frame magnet facing surface are the opposite of each other and interact so as to enable the movement of the exterior housing to control the movement of the interior housing, and wherein the interior housing frame further has a central opening for enabling viewing the environment therethrough, wherein the interior housing is comprised of buoyant material, enabling it to float if it becomes separated from the exterior housing during use, and wherein the interior housing further includes sealed airspace.

* * * * *